Patented Aug. 15, 1933

1,922,387

UNITED STATES PATENT OFFICE 1,922,387

SILVER PLATING COMPOUND AND METHOD OF SILVER PLATING

John H. Müller, Secane, Pa., assignor to International Resistance Company, Philadelphia, Pa., a Corporation of Delaware No Drawing. Application December 12, 1930
Serial No. 501,926

7 Claims. (Cl. 91—70.1)

My invention relates to the plating of objects or portions of objects with a thin film or layer of metallic silver. The object of my invention is to provide a silver plating compound and method of using the same by means of which the articles or portions of articles to be plated can be provided with a thin film or layer of closely adhering metallic silver, well adapted to serve as an electric conductor and my invention consists partly in providing a new silver plating compound and partly in the method of silver plating involving the use of my new compound and process of forming a thin, closely adhering film or layer of silver upon the object to be plated. My new compound consists of a more or less liquid mixture made up of a protective colloid formed by dissolving a mucilage gum or glue in water, with which is intimately mixed silver oxide and a silver salt of an organic acid, which is at least partly soluble in the colloid vehicle. The coating mixture which appears to give most desirable results is prepared as follows:

100 grams of silver nitrate are dissolved in about a half liter of water and the solution so obtained is precipitated by addition of an excess of sodium hydroxide solution; the precipitated silver oxide is then washed until practically free from excess of alkali and other reaction products and is collected upon a filter. This gives about 70 grs. of silver oxide, which in the still moist condition is then ground up with 60 c. c. of mucilage or dissolved gum and the intimate mixture is treated with 20 grs. of glacial acetic acid while actively stirring. It will be noted that this quantity of acid is about half the calculated amount to convert the silver oxide present to acetate; consequently, its addition leaves much of the silver oxide unchanged and suspended in the mass of mucilage or dissolved gum. The silver acetate formed is then present in both true solution and colloidal dispersion and in intimate mixture with the same mass.

The relative proportions of silver acetate or other silver salt of an organic acid to the silver oxide present in the mass may be varied within quite wide limits bearing in mind that to obtain a good mirror-like deposit of silver the acetate should not be less than twenty percent of the oxide and also bearing in mind that the higher the percentage of acetate present the higher the temperature required to produce the deposit. The proportion of acetate to oxide should not, I believe, exceed ninety percent.

I have found that silver acetate is the most advantageous salt of silver to be used in my mixture, largely by reason of its solubility in water and the combustible nature of this salt but silver salts of other organic acids may be used if they are at least partly soluble in water or thoroughly dispersed.

In operation my compound in full concentration or diluted with water to say about the consistency of thick cream, can be painted or otherwise spread upon the surface to be silver plated and then by subjecting it to a moderate heat, say from a scarcely visible red heat 350 to 450° C. up to a bright red heat, say 900° C., the mixture is decomposed both the silver oxide and silver salt being converted to pure metallic silver, with complete elimination of all other ingredients of the mixture including the protective colloids. This decomposition is greatly facilitated by the oxygen given off from silver oxide, which brings about complete oxidation of the organic acid radical of the silver salt, and complete combustion of protective colloids originally present in the mixture.

In brief, silver oxide and silver acetate, at slightly elevated temperatures, mutually decompose each other and by simultaneous reduction of the former and oxidation of the latter yielding pure silver as the only non-volatile residuum. The acetate of silver is the most advantageous salt in this connection because it is fairly soluble and hence more thoroughly permeates surfaces to which it is applied, although silver salts of other organic acids can be used if these are thoroughly dispersed in the protective colloid used.

I propose to use my compound and method of application for silver coating the surface of many poorly conducting non-homogeneous materials such as electric arc gas-carbons, amorphous carbon mixtures with inert or nonconducting fillers, binders or diluting material such as are commonly used in grid leaks and all other kinds of electrical resistors, as well as for graphitic carbons or brushes used as resistors or conducting brushes in dynamos or motors or generators. The same compound and process has been shown to be well adapted for silver coating glass, china, porcelain and other heat resisting non-conducting material, and can be so used to establish a uniform film of metallic silver upon which any metal or more silver itself can be subsequently electro-plated. This amounts to stating that such a coating can be substituted for the usual film of graphite which has been commonly employed to make a conducting backing for any electroplating process which may be desired. Moulds or casts of any shape prepared from plaster of paris can also be covered with a uniform silver layer in this way and rendered conducting for electroplating. The process is also adapted for coating the surface of oxidizable metals and so made to act as a protective and non-corroding surface.

It has been clearly shown that such coatings of silver are at least as efficient, if not more so, than any coating of metallic copper which is commonly used for the same purpose and that the cost of such silver plating is not appreciably greater than that incurred in the deposition of copper insofar as the deposition of metallic silver in this way is far easier to carry out and dispenses with the more complicated procedure employed for the usual electrolytic deposition of copper. In brief, it can be claimed that an adherent silver film so produced can perform all of the requirements of a copper film and possesses added advantage because of its still greater conductivity and more decided resistance to corrosion.

Having now described my invention, what I claim as new and desire to secure by Letters Patent, is:

1. The method of forming upon objects to be plated thin films of metallic silver strongly adherent to the surface upon which they are deposited, which consists in painting the surface to be plated with a combustible protective colloid intimately mixed with uncombined silver oxide and with a silver salt of an organic acid which is at least partly soluble in an aqueous solution of the protective colloid and then subjecting the painted surface to heat to bring about the reduction of the silver compounds to metallic silver, with elimination of the combustible ingredients of the compound.

2. The method of claim 1 in which the organic salt of silver employed in the composition is silver acetate.

3. The method of claim 1 as carried out with a painting composition containing silver acetate and silver oxide, in which the relative proportion of silver acetate to silver oxide is between twenty and ninety percent.

4. As a new article of manufacture a silver plating composition made up of a combustible protective colloid with which is incorporated uncombined silver oxide and a silver salt of an organic acid and which salt is at least partly soluble in an aqueous solution of the colloid.

5. In a painting composition as called for in claim 4, the use of silver acetate as an ingredient.

6. A composition as called for in claim 4, in which silver acetate is used in the proportion of from twenty to ninety percent of the silver oxide present in the composition.

7. A painting composition as called for in claim 4, in which the silver compounds present consist of silver acetate approximately sixty percent and silver oxide approximately forty percent.

JOHN H. MÜLLER.